United States Patent [19]

Kazmierczak et al.

[11] Patent Number: 5,252,880
[45] Date of Patent: Oct. 12, 1993

[54] DYNAMOELECTRIC MACHINE ROTOR ENDWINDINGS WITH COOLING PASSAGES

[75] Inventors: Edmund E. Kazmierczak; Victor R. Abate, both of Schenectady, N.Y.

[73] Assignee: General Electric Company, Schenectady, N.Y.

[21] Appl. No.: 980,732

[22] Filed: Nov. 24, 1992

[51] Int. Cl.⁵ .......... H02K 3/46; H02K 9/10; H02K 3/04
[52] U.S. Cl. .................. 310/270; 310/59; 310/55; 310/201
[58] Field of Search .............. 310/52, 54, 55, 57, 310/58, 59, 60 R, 60 A, 61, 64, 65, 201, 206, 207

[56] References Cited

U.S. PATENT DOCUMENTS

| | | | |
|---|---|---|---|
| 2,425,997 | 8/1947 | Criner et al. | 171/252 |
| 2,786,951 | 3/1957 | Morgan | 310/61 |
| 2,833,944 | 5/1958 | Willyoung | 310/61 |
| 3,005,119 | 10/1961 | Schmitt et al. | 310/61 |
| 3,097,317 | 7/1963 | Fechheimer | 310/54 |
| 3,225,231 | 12/1965 | Kudlacik | 310/64 |
| 3,395,299 | 7/1968 | Quay et al. | 310/261 |
| 3,413,499 | 11/1968 | Barton | 310/58 |
| 3,908,140 | 9/1975 | Fidei et al. | 310/54 |
| 4,274,021 | 6/1981 | Kamiya et al. | 310/54 |
| 4,335,324 | 6/1982 | Fujioka et al. | 310/61 |
| 4,543,503 | 9/1985 | Kaminiski et al. | 310/59 |
| 4,598,223 | 7/1986 | Glennon et al. | 310/260 |
| 4,709,177 | 11/1987 | Kaminski | 310/59 |
| 4,814,655 | 3/1989 | Kaminski | 310/260 |

FOREIGN PATENT DOCUMENTS

34279 1/1964 Fed. Rep. of Germany ...... 310/270

Primary Examiner—Emanuel T. Voeltz
Assistant Examiner—C. LaBalle
Attorney, Agent, or Firm—Nixon & Vanderhye

[57] ABSTRACT

The dynamoelectric machine has endwindings including a plurality of superposed conductor bars 22 and adjacent end turns 20. Rabbets 32 are formed along the undersides of the adjoining conductor bars and end turns to receive portions 34 of gussets 30, remaining portions 35 of the gussets projecting to one side of the joint. The conductor bars and end turns have grooves 38, 36 forming cooling passages with ports 42, 40 opening to one side of the joint short of the joint. The gusset 30 has a barrier 44 spaced from the joint and forms with the ports a cooling channel 46 between the ports for transporting cooling gas between the cooling gas channels of the conductor bars and end turns.

20 Claims, 4 Drawing Sheets

DYNAMOELECTRIC MACHINE ROTOR ENDWINDINGS WITH COOLING PASSAGES

TECHNICAL FIELD

The present invention relates to the endwindings of a rotor of a dynamoelectric machine and particularly relates to the formation of cooling passages about the corners of the rotor endwindings.

BACKGROUND

A rotor for a dynamoelectric machine typically comprises a cylindrical forging of magnetic metal having a plurality of longitudinal slots opening through the outer surface of the rotor at circumferentially spaced positions thereabout. Conductor bars are disposed in the slots for carrying current. The ends of the conductor bars are suitably connected with conductive end turns to form the required current pattern. Because the conductor bars and end turns give rise to resistive heating, certain dynamoelectric machines require additional cooling of the rotor endwinding. This is typically provided by grooved ventilation passages within the end turns and conductor slot bars through which cooling gas may flow.

The various ventilation schemes which make use of cooling grooves in the endwindings, however, introduce manufacturing complexities. One such complexity is that it is difficult to form or fabricate a well shaped, mechanically sound coil corner with a cooling groove passing through it. It is also somewhat difficult to maintain the shape of the cooling groove to proper tolerances when forming it around the coil corner. In addition, many of the present grooved endwinding ventilation schemes require complex baffling in the endwinding region to set up high and low pressure regions to properly channel the cooling gas into and out of the cooling grooves. Some of the baffling schemes require additional shaft machining to create mechanical support for the baffles.

Several approaches have been used to duct cooling gas from grooves in the circumferentially oriented end turns to grooves in the conductor slot bars. The simplest approach was to use round corner turns and let the duct follow the curvature of the corner. This approach, however, does not apply to designs with square corner windings.

For designs with square corner coils, twin layer turns are used to form ducts by laying together two grooved pieces of copper with the grooves facing each other. At the coil corner, a gusset is brazed in place as a means of joining the circumferential end turns to the conductor bars. At the coil corner, the gusset is also grooved so as to allow cooling gas to flow from the end turn to the conductor bar.

A third approach involves feeding the gas into each turn on both sides of the coil corner and ducting it away from the coil corner. This requires additional baffling in the pole center to create a low pressure region into which the gas in the end turns can flow which creates an undesirable amount of complexity.

A fourth approach, as described in Kaminski et al, U.S. Pat. No. 4,543,503, makes use of single layer conductor bars and twin layer end turns. Gas is channeled away from the coil corners much like in the third approach described above.

A fifth approach, described in U.S. Pat. No. 4,814,655, requires the gas to flow through the reverse side of a single layer gusset. This involves an undesirable degree of pressure loss.

A sixth approach does not rely on internal ducts at all but rather channels all the gas externally via sinuous passages in the coil-to-coil blocking. This has the disadvantage of giving up the benefits of free convection cooling. It also creates a rigid endwinding structure which is not conducive to thermal expansion of the rotor winding.

DISCLOSURE OF INVENTION

In accordance with the present invention, complexities of manufacture are minimized or eliminated in forming cooling passages at the corner of the endwindings. To accomplish this, the endwindings comprise stacks of conductor slot bars and end turns wherein each conductor bar registers with an end turn forming a junction, in this case, a square corner junction which is reinforced using a gusset. Thus, an endwinding set may be defined as a conductor bar joined with a registering end turn by a gusset, it being appreciated that a plurality of stacked winding sets are provided, separated by electrical insulating material. To form corner cooling passages, one or more of the endwinding sets is provided with cooling passages for passing cooling gas. These passages extend toward the junction and terminate in ports opening through the conductor bar and end turn on one side of the joint.

The ends of the conductor bar and end turn of each winding set are rabbeted to receive a gusset which projects away from the juncture and toward the one joint side. A barrier is formed on the gusset and is spaced from the junction. The barrier projects the full height of the conductor bar and end turn of a winding set toward the gusset of an adjacent overlying or underlying winding set to define with the portion of the gusset projecting away from the junction a cooling passage for flowing cooling gases between the ports. Each gusset, and particularly its barrier, thus forms a cooling channel external to the juncture of the ends of the conductor bar and end turn thereby eliminating the need for grooving through and around the coil corner while maintaining the strength of the corner. This cooling channel also minimizes any pressure drop of the coolant gas flowing between the conductor bar and end turn. It will be appreciated that while preferably each winding set is provided with the cooling channel formed by the gusset as described, cooling channels need not be formed in each adjacent winding set but may be provided in alternate winding sets or as desired depending upon cooling needs.

The barrier on the gusset extends between the sides or lateral edges of the conductor bar and end turn in each winding set with the barrier forming a sufficient seal with the conductor bar and end turn as well as the adjacent gussets to accommodate thermal expansion of the windings under load conditions. If desired, a barrier block may be provided to insure against leakage between the barrier and the adjoining gussets and elements of the winding set.

In a preferred embodiment according to the present invention, there is provided a dynamoelectric machine having endwindings including at least one conductor bar and at least one end turn having ends forming a junction, a joint including the junction of the one conductor bar and the end turn for facilitating passage of cooling gas therebetween, comprising a gusset secured to ends of the bar and the end turn for strengthening the joint, the bar and the one end turn each having a passage for passing cooling gas therealong and a port for passing cooling gas therethrough, the port in the bar opening through a side thereof and the port in the end turn opening through a side thereof, the ports being located short of the junction and opening toward one side of the joint. The gusset has a portion extending to one side of the joint beyond the conductor bar and the end turn and a barrier is spaced from the junction and projects from the gusset portion on the one side of the joint to define at least a portion of a cooling gas channel extending between the ports and along the gusset portion and the barrier whereby cooling gas may pass through the passages, the ports and the channel.

In a further preferred embodiment according to the present invention, there is provided a dynamoelectric machine having endwindings including at least one conductor bar and at least one end turn lying substantially in a common plane and having ends forming a junction in the plane, a joint including the junction of the bar and end turn for facilitating passage of cooling gas therebetween, comprising a gusset secured to the ends of the conductor bar and the end turn for strengthening the joint. Each conductor bar and one end turn has a passage for transmitting cooling gas therealong and a port for passing cooling gas therethrough, the port in the conductor bar opening through a side thereof and the port in the end turn opening through a side thereof, the ports being located short of the junction and on one side of the joint. The gusset has a portion extending substantially in the common plane and to one side of the joint and having a thickness in a direction normal to the plane less than the thickness of the conductor bar and end turn in the normal direction. The gusset has a barrier of greater thickness in the normal direction than the thickness of the gusset portion and spaced from the junction to define with the gusset portion at least a portion of a cooling gas channel extending between the ports and along the gusset portion on one side of the joint whereby cooling gas may pass along the passages, the ports and the channel.

In a still further preferred embodiment according to the present invention, there is provided a dynamoelectric machine comprising endwindings including a plurality of superposed conductor bars and a plurality of superposed adjacent end turns with each conductor bar in registry with an adjacent end turn and with ends thereof forming a junction. A plurality of gussets are provided, each gusset being secured to the ends of the conductor bar and the end turn for strengthening the junction therebetween and defining therewith a winding set, superposed winding sets of the conductor bars, end turns and gussets forming a joint assembly. One of the winding sets has a first conductor bar and a first end turn each having a passage for transmitting cooling gas therealong, a port in the first bar in communication with the passage thereof for passing cooling gas therethrough, a port in the first end turn in communication with the passage thereof for passing cooling gas therethrough, the ports being located in the first conductor bar and the first end turn, respectively, adjacent the junction and on one side of the joint. The one winding set has a first gusset of the plurality of gussets including a gusset portion projecting to one side of the joint and beyond the first conductor bar and the first end turn. The first gusset also has a barrier spaced from the junction and projecting from the first gusset portion toward the gusset of a next adjacent winding set, the barrier defining with the gusset portion of the first gusset and a portion of the gusset of the next adjacent winding set, at least a portion of a cooling gas channel extending between the ports and along the first and next adjacent gusset portions on one side of the joint whereby cooling gas may pass through the passages, the ports and the channel.

In a still further preferred embodiment according to the present invention, there is provided a dynamoelectric machine comprising endwindings including a plurality of superposed conductor bars and a plurality of superposed adjacent end turns with each conductor bar in registry with an adjacent end turn and with ends thereof forming a junction. A plurality of gussets is provided, each gusset being secured to the ends of the conductor bar and the end turn for strengthening the junction therebetween and defining therewith a winding set, superposed winding sets of the conductor bars, end turns and gussets forming a joint assembly, each of a plurality of the winding sets having a first conductor bar and a first end turn each having a passage for transmitting cooling gas therealong, a port in the first bar in communication with the passage thereof for passing cooling gas therethrough, a port in the first end turn in communication with the passage thereof for passing cooling gas therethrough, the ports being located in the first conductor bar and the first end turn, respectively, adjacent the junction and on one side of the joint. Each winding set of the plurality of winding sets has a first gusset of the plurality of gussets including a gusset portion projecting to the one side of the joint and having an edge beyond the first conductor bar and the first end turn. A barrier block is engaged along the edges of the gusset portions to define with the gusset portions of the first gussets and portions of the gussets of the next adjacent winding sets, at least portions of cooling gas channels extending between the ports and along the first and next adjacent gusset portions on the one side of the joint whereby cooling gas may pass through the passages, the ports and the channel.

Accordingly, it is a primary object of the present invention to provide in a dynamoelectric machine, endwindings having cooling passages which minimize or eliminate complex manufacturing procedures and provide cooling passages through portions of projecting gussets used to reinforce the joints between the conductor bar and end turn of each winding set while simultaneously affording cooling of the coil corner and avoiding substantial pressure drop of the cooling gas.

These and further objects and advantages of the present invention will become more apparent upon reference to the following specification, appended claims and drawings.

BEST MODE FOR CARRYING OUT THE INVENTION

Reference will now be made in detail to a present preferred embodiment of the invention, an example of which is illustrated in the accompanying drawings.

Figure 1:
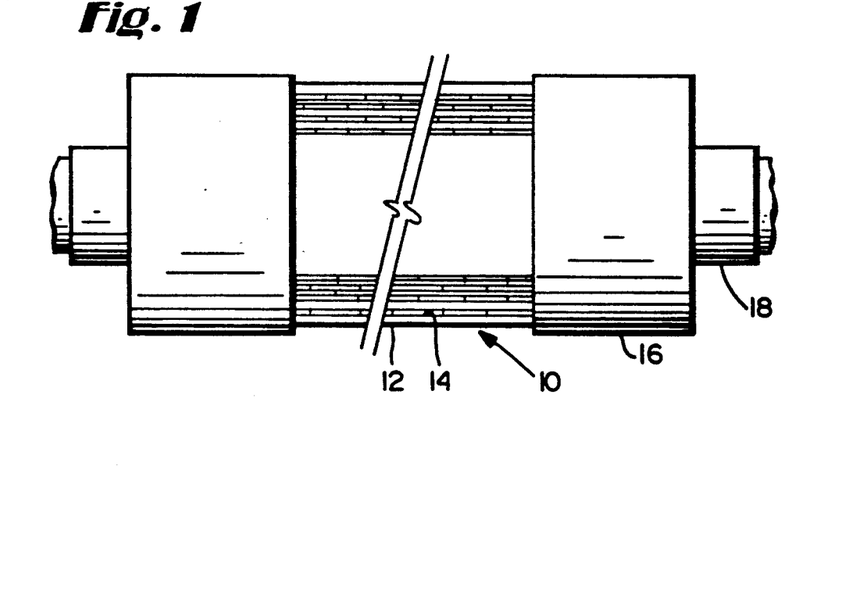
FIG. 1 is a fragmentary side elevational view of the rotor of a dynamoelectric machine incorporating endwindings with cooling passages according to the present invention.

Referring to FIG. 1, there is illustrated a rotor, generally designated 10, for a dynamoelectric machine which also includes a stator, not shown, surrounding the rotor. Rotor 10 includes a generally cylindrical rotor forging body 12 having a plurality of circumferentially spaced, longitudinally extending slots 14 containing stacked conductor bars. The conductor bars are interconnected at opposite ends with end turns to form endwindings housed within end caps 16. Rotor shafts 18 project from the opposite ends of the rotor and these may be integrally formed or otherwise connected with the rotor body 12. The operation of the dynamoelectric machine is well known and need not be described further.

Figure 2:
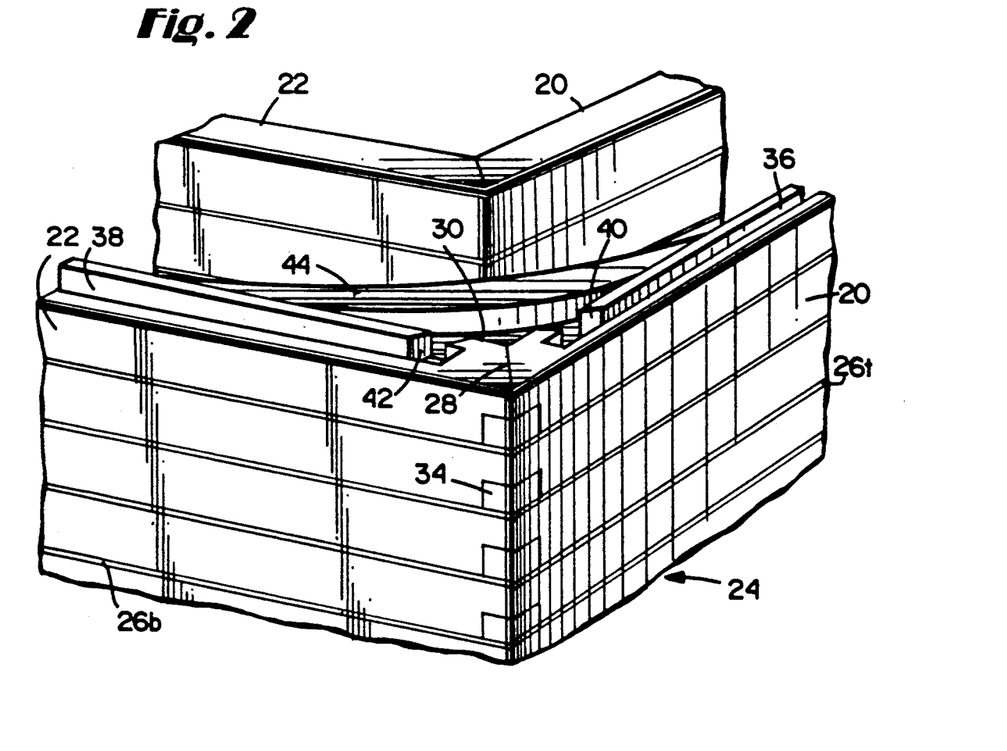
FIG. 2 is an enlarged fragmentary perspective view illustrating the miter joints between stacked end turns and conductor bars and the gussets according to the present invention.

Referring to FIG. 2, there is illustrated superposed stacks of joined end turns 20 and conductor bars 22 forming stacked endwindings, generally designated 24. The stacked conductor bars 22 are maintained in the slots 14 of the rotor body 12, typically by wedges, not shown, and are formed of conductive material, such as copper. The individual conductor bars are separated by electrical insulation 26b. The end turns 20, as well known, interconnect the conductor bars 22 extending through the slots in the rotor body across each end of the rotor body and are likewise separated one from the other by electrical insulation 26t. The individual conductor bars 22 are connected with the end turns 20 at joints including a mitered junction 28 between each corresponding (aligned) conductor bar and end turn.

Figure 3:
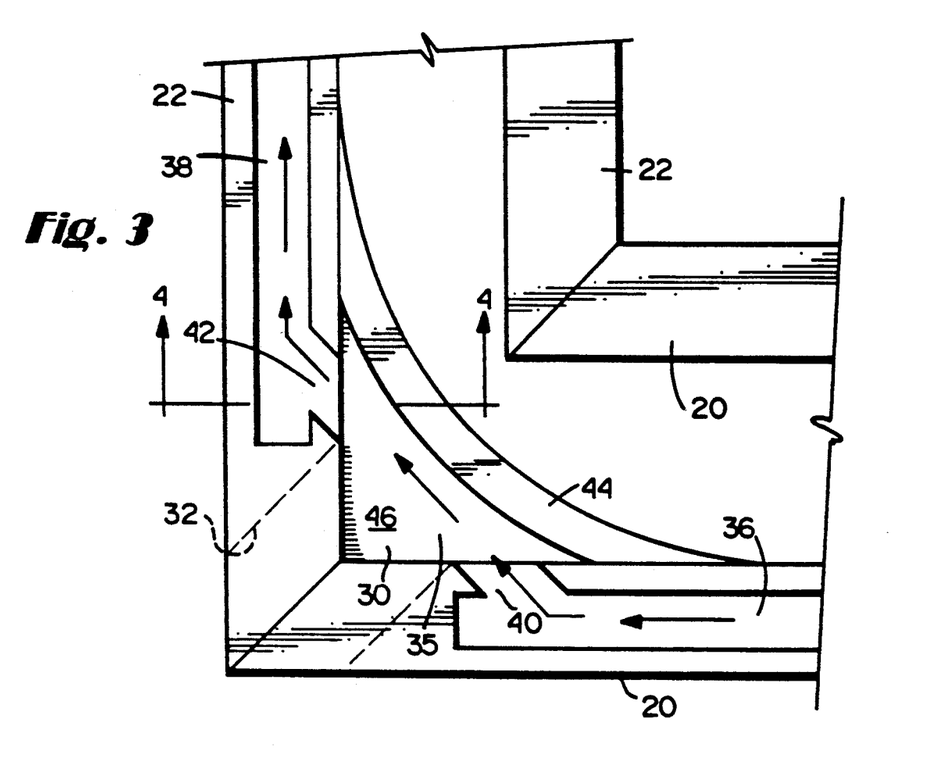
FIG. 3 is a top plan view thereof with superposed winding sets removed to illustrate the junction between an end turn and a conductor bar using a gusset according to the present invention.

More particularly, and referring to FIG. 2, the abutting surfaces of each conductor bar 22 and corresponding end turn 20 are reinforced by a gusset 30 which overlaps the ends of the conductor bar and end turn, these elements forming an endwinding set. In a preferred form, the ends of the conductor bars 22 and end turns 20 are partially cut away, for example, along their undersides as illustrated in FIG. 2, to form rabbets, the outlines of which are illustrated in FIG. 3 by the dashed lines 32. Gusset 30 includes a gusset portion 34 which is received within rabbets 32 and secured to the registering conductor bar and end turn, for example, by brazing, to reinforce the connection between a corresponding conductor bar and end turn.

It will be appreciated that, in certain installations, cooling passages are provided within one or more of the winding sets at each corner. For example, cooling passages 36 may be formed in the end turns 20 and cooling passages 38 may be formed in the conductor bars 22. These cooling passages essentially comprise grooves formed through the top or bottom surfaces of the conductor bar and end turn for conducting cooling gas. It will be appreciated that the cooling passages need not be in each conductor bar and end turn but can be alternated or formed in selected ones of the registering conductor bars and end turns, as desired, depending upon cooling needs.

In accordance with the present invention, the cooling passages 36 and 38, where provided, have ports 40 and 42, respectively, which open toward one side of the joint between the conductor bar and end turn, preferably the side of the joint formed by the conductor bar and end turn forming an included angle. Ports 40 and 42 extend through the walls of the conductor bar and end turns at locations short of the mitered joint between the ends thereof and short of gusset 30 used to reinforce the mitered ends.

In accordance with the present invention, each gusset is particularly configured to afford a cooling passage on the one side of the joint for communicating cooling gas from one port to the other port in a manner which facilitates cooling the corner joint, yet which affords a simplicity of manufacture and avoidance of substantial pressure drop of cooling gas across the endwindings. To accomplish this, it will be appreciated from a review of drawing FIGS. 2-6 that gusset 30 has a depth, i.e., a thickness, less than the depth or thickness of the conductor bar and end turn which is reinforced by the gusset. Particularly, the gusset has a thickness corresponding to the depth of the rabbets 32 formed in the conductor bar and end turn. The gusset portion 34 received in the rabbets projects to one side of the joint and terminates in a barrier 44. Barrier 44 has a full depth or height corresponding substantially to the depth or height of the conductor bar and end turn. Thus, by projecting gusset 30 from gusset portion 34 to one side of the joint to terminate in a barrier 44, a reduced height portion 35 of the gusset 30 extends between ports 40 and 42 forming a cooling gas channel 46 between passages 36 and 38 in the end turn and conductor bar, respectively. The barrier 44, of course, is shaped to engage and seal at its opposite ends with the respective end turn 20 and conductor bar 22. The barrier 44 is similarly electrically insulated from underlying and superposed barriers 44 of similar gussets 30 by electrical insulating material similarly as the stacked superposed conductor bars and stacked superposed end turns are electrically insulated one from the other.

Figure 4:
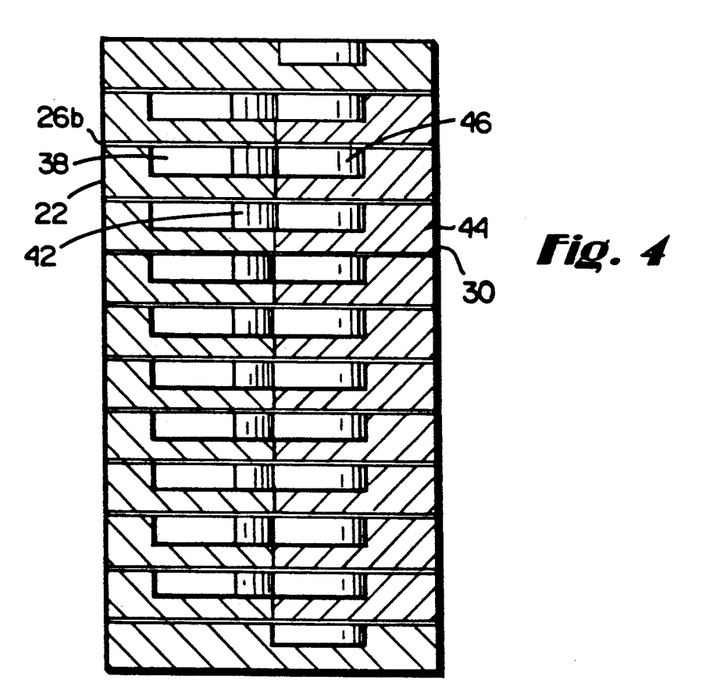
FIG. 4 is a cross-sectional view thereof taken generally about on line 4—4 in FIG. 3.
Figure 5:
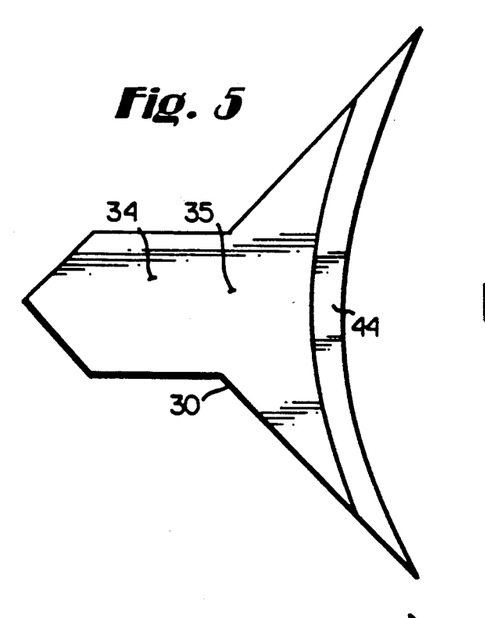
FIG. 5 is a plan view of a gusset used in the joint between the end turns and conductor bars.
Figure 6:
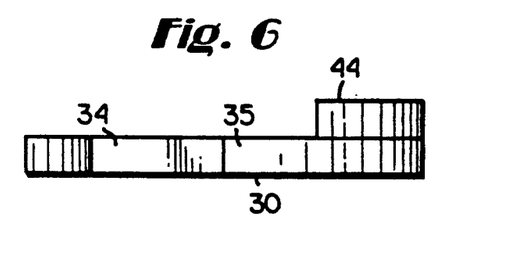
FIG. 6 is a side elevational view of the gusset illustrated in FIG. 5.

The joint thus formed is illustrated in FIG. 4. It will be appreciated that the channel 46 formed by the barrier is formed by the raised wall of barrier 44, the interior walls of the conductor bar 22 and end turn 20, the gusset portion 35 and the overlying gusset 30. Advantageously, channel 46 is positioned to cool the walls of the conductor bar and end turn at the mitered joint, as well as the reduced height portion of the gusset per se. By forming the channel 46 in the gusset, it is possible to maintain substantially the same duct cross-sectional area in the channel 46 as in the cooling channels 36 and 38 in the end turns and conductor bars. This minimizes irregularities in the flow path and pressure drop through the cooling circuit. Further, the cooling channel 46 maintains cooling gas in direct contact with the stack of copper field turns at the coil corner, effectively cooling the coil corner. The gussets per se improve heat transfer because they act as heat transfer fins, increasing the available heat transfer area.

Because of the uniform height of the barriers 44 in the stacked endwinding sets around the coil corner, the centrifugal force caused by rotation of the rotor will improve the sealing of the ducts. Thus, cooling gas leakage at the coil corner is substantially minimized or eliminated.

While the gusset cooling channel has been shown on the inside of the corner joint, the gusset could also be formed on the outside of the corner joint or on both the inside and outside of the coil corner to define the cooling channel or channels. Thus, the gusset could extend to the outside of the joint with a barrier formed thereabout or the gusset could extend to the opposite sides of the joint with a pair of barriers on the opposite sides of the joint defining with the conductor bar and end turn of the joint a pair of cooling channels formed by the gussets on opposite sides of the joint.

Figure 7:
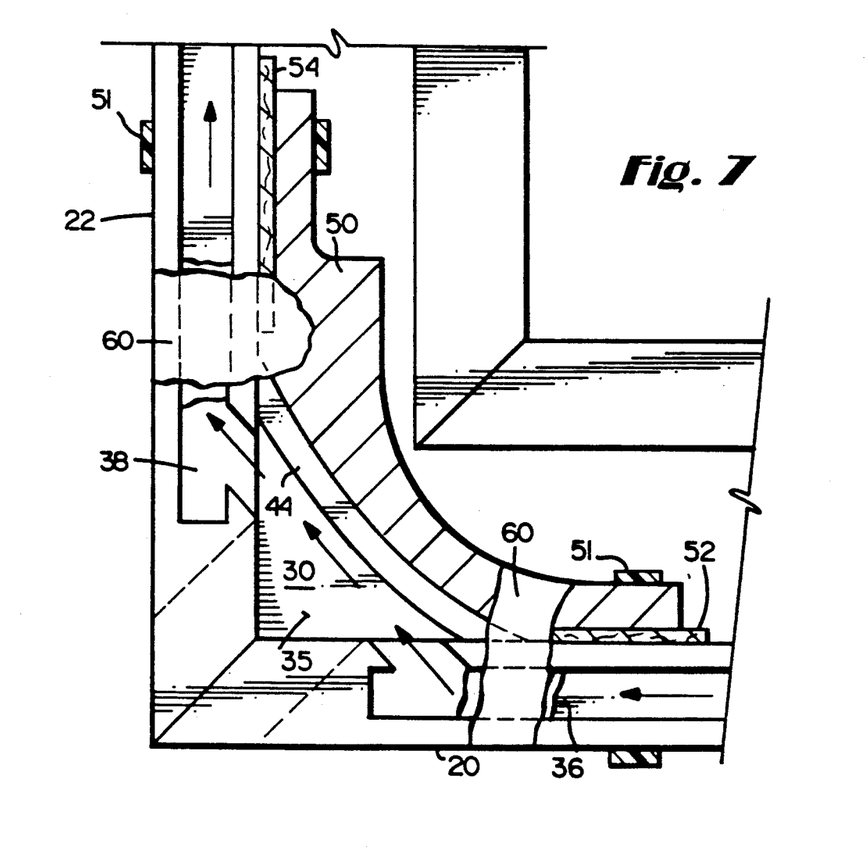
FIG. 7 is a horizontal cross-sectional view through the joint of an end turn and conductor bar with a barrier block providing additional sealing for the cooling passage in accordance with a further embodiment of the present invention.

Referring now to FIG. 7, there is illustrated an embodiment of the invention similar to that described in FIGS. 1-6. In this embodiment, however, there is provided a corner block or barrier block 50 which extends the full height of the stacked endwindings. The barrier block 50 is formed of non-electrically conductive material and bears against the stacked barriers 44 of the gussets to assist in affording seals between the barriers of the gussets. The barrier block 50 is sealed at its opposite ends against the side walls of the conductor bars and end turns by flexible sealing members 52 and 54. When the conductor bars and end turns are stacked, the walls of the stacked conductor bars and end turns may be offset or non-uniform one from the other and thus may afford gaps or voids where the conductor bars or end turns overlap one another. Thermal growth of the field coils under load conditions can create additional voids or gaps and exacerbate the problem of cooling gas leakage. Consequently, the seals 52 and 54 at the end of the barrier block 50 are conformable, non-metallic seals, for example, formed of a felt material, which effectively fill any voids or gaps to minimize cooling gas leakage. Thus, the barrier block forms with the corner gussets sealed cooling ducts for minimizing cooling gas leakage. The barrier block 50 may be suitably secured to the conductor bars and end turns by non-conducting ties 51. The ties may compress the conformable seals to conform the block to the stacked barriers and the stack of end turns and conductor bars to fill voids and prevent leakage.

Figure 8:
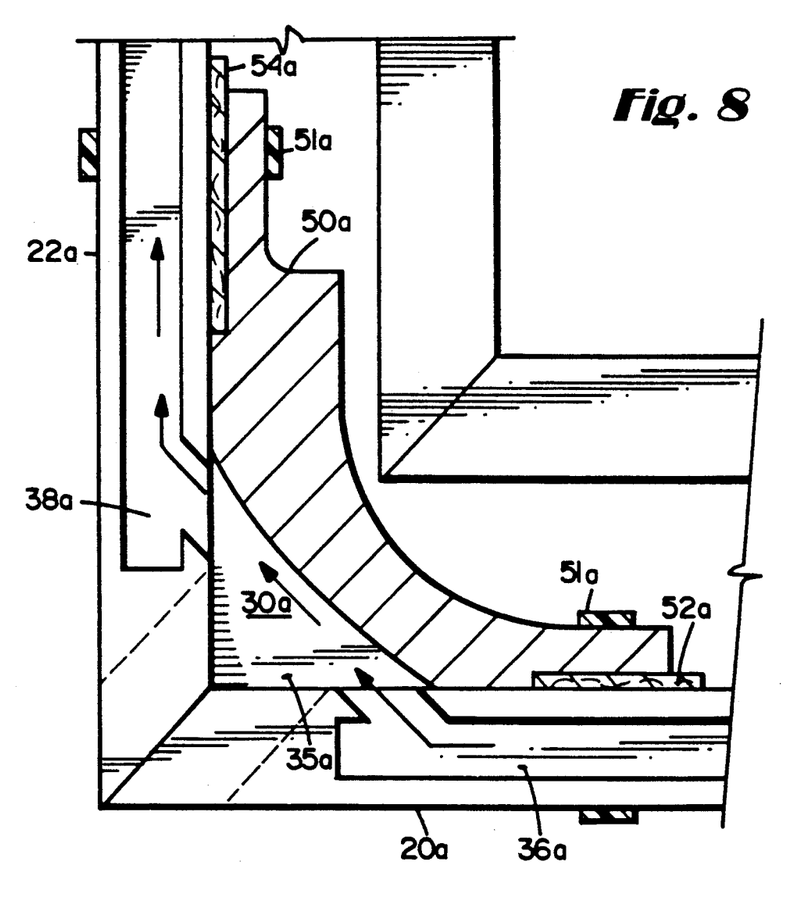
FIG. 8 is a view similar to FIG. 7 illustrating a still further form of the present invention wherein the barrier block forms a wall forming part of the cooling passages.

The embodiment illustrated in FIG. 8 is somewhat similar to the embodiment illustrated in FIG. 7 and like reference numerals followed by the suffix "a" are applied to indicate like parts. In this embodiment, however, the gusset 30a is flat and of uniform thickness. That is, the gusset 30a does not have a projecting barrier 44 as in the previous embodiment. The barrier block 50a is formed similarly of non-electrically conductive material and bears against the gussets 30a which are spaced one from the other and thus the wall of the barrier in opposition to the gussets defines a wall of the cooling ducts for passing cooling gas between the cooling passages 36a and 38a. The barrier may be formed of a rigid or flexible material and is conformal to the radiussed edge of the corner gussets 30a. Block 50a thus forms the vertical barrier defining the corner wall of the cooling passages and takes the place of the vertical barriers of the earlier described embodiment of FIG. 7. The block 50a may be similar secured to the conductor bars and end turns by non-conducting ties, not shown, similarly as in the prior embodiment.

In the previous embodiments, leakage may occur at the top and bottom of the barrier block where the block is in contact with the coil corner. Top and bottom flexible non-metallic caps, for example, cap 60 in FIG. 7, may be suitably secured to the top and bottom of the barrier block and also to the top and bottom of the slot bars and end straps. These sealing caps provide seals enhanced when the rotor is spinning and centrifugal forces are exerted on the rotor winding and on the barrier block and caps themselves.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine having endwindings including at least one conductor bar and at least one end turn having ends forming a junction, a joint including said junction of said conductor bar and said end turn for facilitating passage of cooling gas therebetween, comprising:

a gusset secured to the ends of said conductor bar and said end turn for strengthening said joint;

said one conductor bar and said one end turn each having a passage for passing cooling gas therealong and a port for passing cooling gas therethrough, said port in said conductor bar opening through a side thereof and said port in said end turn opening through a side thereof, said ports being located short of said junction and opening toward one side of said joint;

said gusset having a portion extending to said one side of said joint beyond said conductor bar and said end turn and a barrier spaced from said junction and projecting from said gusset portion on said one side of said joint to define at least a portion of a cooling gas channel extending between said ports and along said gusset portion and said barrier whereby cooling gas may pass through said passages, said ports and said channel.

2. A joint according to claim 1 wherein said barrier extends and engages between said conductor bar and said end turn on said one side of said joint.

3. A joint according to claim 1 wherein the ends of said conductor bar and said end turn have adjoining rabbets formed therein, said gusset being received in said rabbets, said conductor bar and said end turn extending substantially at right angles relative to one another with the ends thereof forming a miter joint, surfaces of said one bar and said end turn on said one joint side and in spaced opposition to said barrier defining at least another portion of said cooling gas channel.

4. A joint according to claim 3 wherein said gusset includes opposite side edges in said rabbets, respectively, extending generally parallel to said mitered joint, said gusset having end edges generally parallel to side edges of said bar and said end turn, respectively, on the side of said joint opposite said one side.

5. A joint according to claim 1 wherein said conductor bar and said end turn form an included angle therebetween on said one side of said joint.

6. A joint according to claim 1 wherein said barrier extends and engages between said conductor bar and said end turn on said one side of said joint, the ends of said conductor bar and said end turn having adjoining rabbets formed therein, said gusset being received in said rabbets, said conductor bar and said end turn extending substantially at right angles relative to one another forming an included angle on said one joint side, the ends of said conductor bar and said end turn forming a miter joint, surfaces of said one conductor bar and said end turn on said one side of said joint and in spaced opposition to said barrier defining at least another portion of said cooling gas channel, said gusset including opposite side edges in said rabbets, respectively, extending generally parallel to said mitered joint, said gusset having end edges generally parallel to side edges of said conductor bar and said end turn, respectively, on the side of said joint opposite said one side.

7. A joint according to claim 1 including a barrier block disposed on the side of said barrier remote from said cooling gas channel and bearing against said barrier.

8. A joint according to claim 7 including flexible non-conducting ties coupling said barrier block to said conductor bar and said end turn.

9. In a dynamoelectric machine having endwindings including at least one conductor bar and at least one end turn lying substantially in a common plane and having ends forming a junction in said plane, a joint including said junction of said conductor bar and said end turn for facilitating passage of cooling gas therebetween, comprising:
a gusset secured to the ends of said conductor bar and said end turn for strengthening said joint;
each said conductor bar and said one end turn having a passage for transmitting cooling gas therealong and a port for passing cooling gas therethrough, said port in said conductor bar opening through a side thereof and said port in said end turn opening through a side thereof, said ports being located short of said junction and on one side of said joint;
said gusset having a portion extending substantially in said plane and to said one side of said joint and having a thickness in a direction normal to said plane less than the thickness of said conductor bar and said end turn in said normal direction;
said gusset having a barrier of greater thickness in said normal direction than the thickness of said gusset portion and spaced from said junction to define with said gusset portion at least a portion of a cooling gas channel extending between said ports and along said gusset portion on said one side of said joint whereby cooling gas may pass through said passages, said ports and said channel.

10. A joint according to claim 9 wherein said barrier extends between said conductor bar and said end turn on said one side of said joint and has a thickness in said normal direction substantially equal to the thickness of said one conductor bar and said end turn.

11. A joint according to claim 9 wherein the ends of said conductor bar and said end turn have adjoining rabbets formed therein, said gusset being received in said rabbets, said conductor bar and said end turn extending substantially at right angles relative to one another with the ends thereof forming a miter joint therebetween, surfaces of said one conductor bar and said end turn on said one joint side and in spaced opposition to said barrier defining at least another portion of said cooling gas channel.

12. A joint according to claim 11 wherein said gusset includes opposite side edges in said rabbets, respectively, extending generally parallel to said miter joint, said gusset having end edges generally parallel to side edges of said conductor bar and said end turn, respectively, on the side of said joint opposite said one side.

13. A dynamoelectric machine comprising:
endwindings including a plurality of superposed conductor bars and a plurality of superposed adjacent end turns with each conductor bar in registry with an adjacent end turn and with ends thereof forming a junction;
a plurality of gussets, each gusset being secured to the ends of said conductor bar and said end turn for strengthening the junction therebetween and defining therewith a winding set, superposed winding sets of the conductor bars, end turns and gussets forming a joint assembly;
one of said winding sets having a first conductor bar and a first end turn each having a passage for transmitting cooling gas therealong, a port in said first bar in communication with the passage thereof for passing cooling gas therethrough, a port in said first end turn in communication with the passage thereof for passing cooling gas therethrough, said ports being located in said first conductor bar and said first end turn, respectively, adjacent said junction and on one side of said joint;
said one winding set having a first gusset of said plurality of gussets including a gusset portion projecting to said one side of said joint and beyond said first conductor bar and said first end turn;
said first gusset having a barrier spaced from said junction and projecting from said first gusset portion toward the gusset of a next adjacent winding set, said barrier defining with said gusset portion of said first gusset and a portion of the gusset of said next adjacent winding set, at least a portion of a cooling gas channel extending between said ports and along said first and next adjacent gusset portions on said one side of said joint whereby cooling gas may pass through said passages, said ports and said channel.

14. A joint according to claim 13 wherein said barrier extends and engages between said first conductor bar and said first end turn on said one side of said joint.

15. A joint according to claim 13 wherein the ends of said conductor bars and said end turns have adjoining rabbets formed therein, said gussets being received in said rabbets, said conductor bars and said end turns extending substantially at right angles relative to one another with the ends thereof forming miter joints, surfaces of said first conductor bar and said first end turn on said one joint side and in spaced opposition to said barrier defining at least another portion of said cooling gas channel.

16. A joint according to claim 15 wherein said each of said gussets includes opposite side edges in said rabbets, respectively, extending generally parallel to said mitered joint, said gussets having end edges generally parallel to side edges of said conductor bars and said end turns, respectively, on the side of said joint opposite said one side.

17. A joint according to claim 13 wherein said conductor bars and said end turns form an included angle therebetween on said one side of said joint.

18. A dynamoelectric machine comprising:
endwindings including a plurality of superposed conductor bars and a plurality of superposed adjacent end turns with each conductor bar in registry with an adjacent end turn and with ends thereof forming a junction;

a plurality of gussets, each gusset being secured to the ends of said conductor bar and said end turn for strengthening the junction therebetween and defining therewith a winding set, superposed winding sets of the conductor bars, end turns and gussets forming a joint assembly;

each of a plurality of said winding sets having a first conductor bar and a first end turn each having a passage for transmitting cooling gas therealong, a port in said first bar in communication with the passage thereof for passing cooling gas therethrough, a port in said first end turn in communication with the passage thereof for passing cooling gas therethrough, said ports being located in said first conductor bar and said first end turn, respectively, adjacent said junction and on one side of said joint;

each winding set of said plurality of winding sets having a first gusset of said plurality of gussets including a gusset portion projecting to said one side of said joint and having an edge beyond said first conductor bar and said first end turn;

a barrier block engaged along said edges of said gusset portions to define with said gusset portions of said first gussets and portions of the gussets of said next adjacent winding sets, at least portions of cooling gas channels extending between said ports and along said first and next adjacent gusset portions on said one side of said joint whereby cooling gas may pass through said passages, said ports and said channel.

19. A dynamoelectric machine according to claim 18 including flexible non-conducting ties coupling said barrier block to said conductor bars and said end turns in substantial sealing relation therewith and with said gusset edges.

20. A dynamoelectric machine according to claim 18 including at least one sealing cap extending between said barrier and a conductor bar and end turn.

* * * * *